United States Patent
Mossoba et al.

(10) Patent No.: US 10,484,377 B1
(45) Date of Patent: Nov. 19, 2019

(54) SYSTEMS AND METHODS FOR MULTI-DEVICE MULTI-FACTOR AUTHENTICATION

(71) Applicant: Capital One Services, LLC, McLean, VA (US)

(72) Inventors: Michael Mossoba, Arlington, VA (US); Joshua Edwards, Philadelphia, PA (US); Salik Shah, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/162,565

(22) Filed: Oct. 17, 2018

(51) Int. Cl.
*H04L 29/06* (2006.01)
*H04L 9/32* (2006.01)

(52) U.S. Cl.
CPC .......... *H04L 63/0892* (2013.01); *H04L 9/321* (2013.01); *H04L 9/3228* (2013.01); *H04L 63/0838* (2013.01); *H04L 2463/082* (2013.01)

(58) Field of Classification Search
CPC ............. H04L 63/0838; H04L 63/0892; H04L 9/3228; H04L 9/321
See application file for complete search history.

(56) References Cited

U.S. PATENT DOCUMENTS

| | | | |
|---|---|---|---|
| 9,106,646 B1 * | 8/2015 | Zheng | H04L 63/0853 |
| 9,363,262 B1 * | 6/2016 | Wilkes | H04L 63/083 |
| 9,686,272 B2 * | 6/2017 | Blinn | H04L 63/083 |
| 10,148,631 B1 * | 12/2018 | Sokolov | H04L 63/08 |
| 10,212,588 B2 * | 2/2019 | Grim | H04L 63/08 |
| 2012/0166553 A1 * | 6/2012 | Rubinstein | G06Q 50/01 709/206 |
| 2012/0272307 A1 * | 10/2012 | Buer | G06F 21/34 726/9 |

(Continued)

OTHER PUBLICATIONS

Stebila, Douglas, Poornaprajna Udupi, and Sheueling Chang. "Multi-factor password-authenticated key exchange." Conferences in Research and Practice in Information Technology. vol. 105. Australian Computer Society, ACM, 2010. (Year: 2010).*

(Continued)

*Primary Examiner* — Kari L Schmidt
(74) *Attorney, Agent, or Firm* — DLA Piper LLP (US)

(57) ABSTRACT

Systems and methods for improved security authentication are disclosed. In some embodiments, an improved system for security authentication may include a plurality of computing devices, and a server system communicatively coupled to the plurality of computing devices. The server system may be configured to receive a request for security authentication, determine an authorization providing computing device from among the plurality of computer devices based on authentication preferences stored in a database communicatively coupled to the server system, generate and transmit authentication information to the determined authorization providing computing device, receive, from an initiating computing device an authentication input, determine whether the received authentication input matches the transmitted authentication information, and complete the request for security authentication when the received authentication input matches the generated and transmitted authentication information.

14 Claims, 3 Drawing Sheets

(56) References Cited

U.S. PATENT DOCUMENTS

| | | | |
|---|---|---|---|
| 2015/0128240 A1* | 5/2015 | Richards | H04L 63/0861 |
| | | | 726/7 |
| 2016/0180068 A1* | 6/2016 | Das | G06F 21/32 |
| | | | 726/7 |
| 2017/0163471 A1* | 6/2017 | Zheng | H04L 29/08594 |
| 2019/0042723 A1* | 2/2019 | Cockcroft | G06F 21/36 |
| 2019/0164165 A1* | 5/2019 | Ithabathula | G06Q 20/40145 |

OTHER PUBLICATIONS

Sayler, Andy, et al. "Tutamen: A Next-Generation Secret-Storage Platform." Proceedings of the Seventh ACM Symposium on Cloud Computing. ACM, 2016. (Year: 2016).*

Reimair, Florian, Peter Teufl, and Bernd Prünster. "In Certificates We Trust—Revisited." 2015 IEEE Trustcom/BigDataSE/ISPA. vol. 1. IEEE, 2015. (Year: 2015).*

Facebook, "How do I help my friend get back into their account?", Facebook Help Center, Printed Oct. 17, 2018, 1 page.

* cited by examiner

SYSTEMS AND METHODS FOR MULTI-DEVICE MULTI-FACTOR AUTHENTICATION

TECHNICAL FIELD

The present disclosure is generally related to systems and methods for multi-device multi-factor authentication.

BACKGROUND

Multi-factor authentication is an approach to security authentication in which a user is required to provide at least two pieces of evidence (or factors) to confirm their identity in order to be granted access to a secured environment or secured information. Example factors include something the user knows (e.g., a personal identification number, password, pattern), something the user possesses (e.g., an ATM card, phone, fob), or something the user is (e.g., a biometric such as a fingerprint, or voiceprint). For example, two factor authentication may be used while withdrawing money from an automated teller machine (ATM), where the user has to provide the correct pin (something the user knows) and the ATM card (something the user possess).

To access secured environments and information such as online portals for healthcare, banking, e-commerce, email, and the like, a user may undergo multi-factor authentication. For example, a user may receive a short message service (SMS), also referred to as a text message, or email on their phone with a particular code that the user has to provide on an online portal before being able to access the online portal. By having to provide a particular code to the online portal, the user indicates possession of their phone (something the user possess) in addition to login information (something the user knows). Often, the particular code is a one-time code that is valid for only one login session or transaction (i.e., a one-time pin or OTP).

Although multi-factor authentication was created to provide improved security authentication, modern smartphones are used for both browsing email and receiving text messages. Accordingly, if a smartphone is stolen, a thief can normally complete the multi-factor authentication as they have access to text messages, emails, and applications that may be preloaded with login information. In other words, a thief may have access to the OTP and be able to complete the security authentication procedures.

SUMMARY

The present disclosure is directed towards improved systems and methods for security authentication. In some embodiments, the disclosed systems and methods provide multi-device multi-factor authentication.

In some embodiments, the disclosed systems and methods may provide an improvement over conventional systems in which a thief who gains access to a smartphone would be able to complete multi-factor authentication.

In some embodiments, an improved system for security authentication includes a plurality of computing devices and a server system communicatively coupled to the plurality of computing devices. The server system may be configured to receive a request for security authentication from an initiating computing device from among the plurality of computer devices, determine an authorization providing computing device from among the plurality of computer devices based on authentication preferences stored in a database communicatively coupled to the server system, generate and transmit authentication information to the determined authorization providing computing device, receive from the initiating computing device an authentication input, determine whether the received authentication input matches the transmitted authentication information, and complete the request for security authentication when the received authentication input matches the generated and transmitted authentication information. In some embodiments, the user of the initiating computing device is distinct from a user of the authorization providing computing device. In some embodiments, the initiating computing device may be separate and distinct from the authorization providing computing device.

In some embodiments, the authentication preferences may include at least one of authorization providers, authorization provider mode of communication, response timing preferences, and a prioritization scheme for authorization providers. The authentication information may be transmitted to the determined at least one authorization providing computing device via at least one of text, email, a telephone call, a push notification, and a software application. The initiating computing device may include a user interface configured to receive authentication preferences from the user and the initiating computing device is further configured to store the received authentication preferences in the database. The authentication information may be a one-time pin (OTP). The authentication information may be transmitted to a plurality of authorization providing computing devices from among the authorization providing computing device concurrently. The authentication information may be transmitted to a plurality of authorization providing computing devices from among the authorization providing computing device sequentially in accordance with the authentication preferences. The server system may provide an updated user interface to the initiating device, and the updated user interface is configured to receive the authentication input.

In some embodiments, an improved method for security authentication may include receiving a request for security authentication from an initiating computing device, determining an authorization providing computing device from among a plurality of computer devices based on authentication preferences stored in a database communicatively coupled to the server system, wherein a user of the initiating computing device is distinct from a user of the authorization providing computing device, generating and transmitting authentication information to the determined authorization providing computing device, receiving an authentication input, determining whether the received authentication input matches the transmitted authentication information, and completing the request for security authentication when the received authentication input matches the generated and transmitted authentication information.

Authentication preferences may include at least one of authorization providers, authorization provider mode of communication, response timing preferences, a prioritized listing of authorization providers, and a non-prioritized listing of authorization providers. Authentication information may be transmitted to the determined authorization providing computing device via at least one of text, email, a push notification, a software application, and a telephone call. The initiating computing device may include a user interface configured to receive authentication preferences from the user and the initiating computing device is further configured to store the received authentication preferences in the database. The authentication information may include a one-time pin (OTP). In some embodiments, transmitting, via the server system, authentication information to the determined authorization providing computing device is concurrently transmitted. In some embodiments, transmitting, via the server system, authentication information to the determined authorization providing computing device is conducted sequentially in accordance with the authentication preferences. In some embodiments, the method includes the step of providing an updated user interface to the initiating device that is configured to receive the authentication input. In some embodiments, receiving authentication input includes receiving authentication input from at least one of the initiating computing device and the authorization providing computing devices.

In some embodiments, an improved method for security authentication includes the steps of receiving a request for security authentication from an initiating computing device, determining an authorization providing computing device distinct from the initiating computing device based on authentication preferences stored in a database communicatively coupled to the server system, wherein the authorization providing computing device and the initiating computing device are operated by distinct users, generating and transmitting authentication information to the determined authorization providing computing device, receiving an approval from the determined authorization providing computing device, and completing the request for security authentication when an approval is received. Further, in some embodiments, the authorization providing computing device and the initiating computing device may be separate and distinct computing devices.

In some embodiments, authentication preferences includes at least one of authorization providers, authorization provider mode of communication, response timing preferences, a prioritized listing of authorization providers, and a non-prioritized listing of authorization providers. The determined authorization providing computing device may provide the approval after verifying the identity of an user of the determined authorization providing computing device.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

The present disclosure is directed towards improved systems and methods for security authentication. In some embodiments, the disclosed systems and methods provide multi-device multi-factor authentication. The present disclosure may provide an improved method for security authentication that may be used to determine whether a user is authentic and should be provided with access to a secured environment or secured information. Alternatively, the improved method for security authentication may be used to determine whether a secured action should be completed. Secured environments, may include online portals, registries, email accounts, and the like. Secured environments may be used in connection with financial applications (banking, credit cards), e-commerce applications, healthcare applications, utilities, social media accounts, educational logins, workplace logins, and the like. Secured actions may include password resets, completing large banking transactions, and the like. The improved method for security authentication disclosed herein may be used in place of existing multi-factor authentication schemes.

Figure 1:
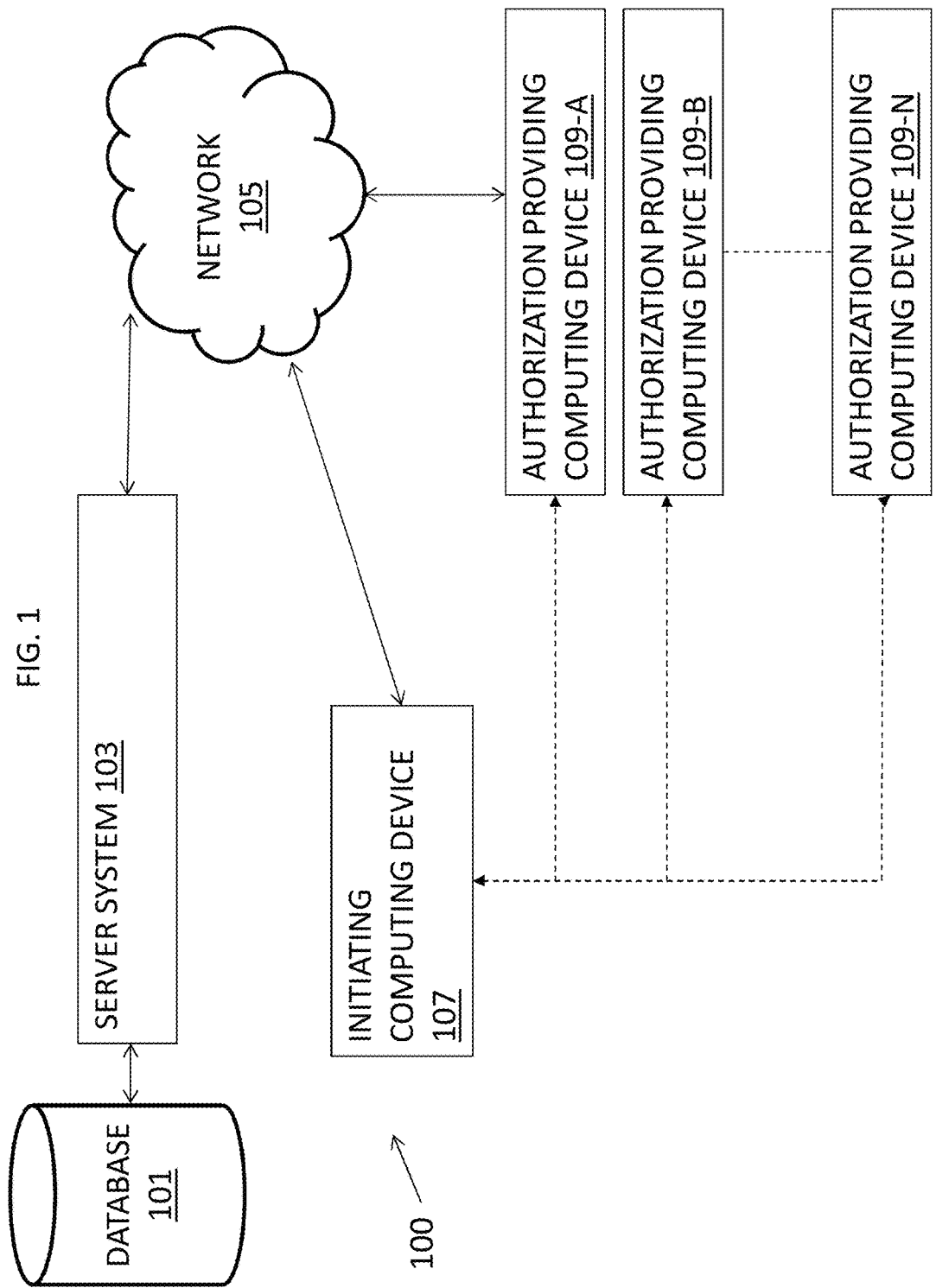
FIG. 1 illustrates a system for improved security authentication in accordance with some embodiments of the present disclosure.

FIG. 1 illustrates a system for improved security authentication in accordance with some embodiments of the present disclosure. As illustrated in FIG. 1, a system 100 may include a database 101, server system 103, network 105, initiating computing device 107 and a plurality of authorization providing computing devices 109-A to 109-N (collectively, 109). As illustrated in FIG. 1, each of the initiating computing device 107 and/or authorization providing computing devices 109 may be communicatively coupled to the server system 103 via a network 105. Further, the initiating computing device 107 may have a separate communication link with the authorization providing computing devices 109. In some embodiments, the initiating computing device 107 may be separate and distinct from the authorization providing computing device 109.

The network 105 may include, or operate in conjunction with, an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks.

The initiating computing device 107 may be a computing device such as a mobile device, smartphone, tablet, laptop, desktop, computing system and the like. In some embodiments, the initiating computing device 107 may include a user interface such as an application, website, email or the like. A user of the initiating computing device 107 may use the user interface to login to a secured environment, to access secured information, or complete secured actions. When the user of the initiating computing device 107 attempts to login to the secured environment, to access secured information, or complete secured actions, the server system 103 may receive the request for security authentication, determine an authorization providing computing device 109 based on authentication preferences stored in the database 101 communicatively coupled to the server system 103, generate and transmit authentication information to the determined authorization providing computing device 109, receive from the initiating computing device 107 or the determined authorization providing computing device 109 an authentication input, determine whether the received authentication input matches the transmitted authentication information, and complete the request for security authentication when the received authentication input matches the generated and transmitted authentication information. In some embodiments, the initiating computing device 107 may be separate and distinct from the authorization providing computing device 109.

In some embodiments, the systems and methods for improved security authentication described herein may utilize a server system 103 that receives a request for security authentication from a first party by way of the initiating computing device 107, and provides authenticating information to a second party by way of the authorization providing computing device 109. The second party may be distinct from the first party. The second party may be pre-identified by the first party in accordance with authentication preferences stored in the database 101. In some embodiments, the second party may receive that authentication information using a push notification on a software application and the like.

In some embodiments, once the second party has received the authenticating information, the second party may initiate a communication with the first party to verify that the first party has indeed requested access to the secured environment or information and if so, provide the first party with the authenticating information. In some embodiments, this may be effectuated by a communication link separate from the network 105. The first party may then provide the information to the server system 103. In some embodiments, the first party may be provided with an updated user interface that is configured to receive the authentication input from the first party. In some embodiments, the first party may have to request the updated user interface from the server system by a clicking a button, or the like. In some embodiments, once the first party has requested access to the secured environment, or secured information, the updated user interface may be automatically provided.

Alternatively, in some embodiments, once the second party has communicated with the first party and verified (i) the identity of the first party and (ii) that the first party has submitted the request for security authentication, the second party may provide the server system 103 with the authenticating information. In some embodiments, the second party may provide the server system 103 with an approval indicating that the first party should be granted access to the secured environment and/or secured information, or that the secured action should be permitted. In some embodiments, the second party may have to verify their own identity by using a biometric tool (e.g., fingerprint, facial scan), password, pin and the like in order to be able to provide approval of the requested access. In some embodiments, where the second party may be configured to grant access to the first party without providing the first party with the authenticating information, the server system 103 may be further configured to verify that the second party and the first party are using unique devices, when the server system 103 receives authorization from the second party (and not the first party). In particular, in some embodiments, the devices associated with each of the first party and the second party, namely the initiating device 107 and the authorizing device 109 may have unique device identifiers. Accordingly, this may prevent a user from simply using the same device to log out and back in, thus subverting the security provided by having a second authorizing device separate from the first initiating device. Further, requiring that the initiating device 107 and the authorizing device 109 have unique device identifiers may also prevent a user having a phone capable of interfacing with multiple SIM cards from subverting the system.

Communication between the sever system, initiating computing device 107 and/or authorization providing computing device 109 may be effectuated by one or more software applications, push notifications, text messages, webpages, emails, and the like.

In some embodiments, the server system 103 may be communicatively coupled to a database 101 that is configured to store authentication preferences. Authentication preferences may include a list of authorization providers (i.e., users of the authorization providing device), a list of individuals the user of the initiating computing device 107 indicates as being acceptable to verify that the user of the initiating computing device 107 is who they say they are. Additionally, in some embodiments, the authentication preferences may include an authorization provider mode of communication, which may be indicative of the mode of communication the authorization provider prefers to communicate with the server system 103 using. For example, the authorization provider mode of communication may indicate that the authorization provider prefers to receive the authentication information from the server system 103 via a text, voice call, email message, software application, and the like.

The authentication preferences may also include response timing preferences. Response timing preferences may include a lifespan (i.e., how long the authentication information generated by the server system 103 is valid), and/or a timeout amount (i.e., how long the server system 103 will wait to receive an authentication input after transmitting the authentication information to the authorization providing computing device 109). The response timing preferences may also include an indication as to whether the server system 103 should try to generate and transmit authentication information to a different authorization providing computing device 109 if the authentication input has not been completed within the timeout amount.

The authentication preferences may also include a prioritization scheme for authorization providers. The prioritization scheme may specify the order in which a set of authorization providers be contacted. For example, a user may specify that the server system 103 first attempts to contact their spouse, followed by siblings, parents, friends, and the like.

The authentication preferences may also include a concurrent/consecutive setting, in which the user specifies whether authorization providers are contacted concurrently or consecutively. In accordance with the concurrent setting, multiple authorization providers from the list of authorization providers may be contacted at once and provided with the same authentication information. In accordance with the consecutive setting, the authorization providers may be contacted sequentially, one after the other, if the authentication information has timed out. In the consecutive setting, authorization providers may be contacted consecutively in accordance with a prioritization scheme. Alternatively, the authorization providers may be contacted in any suitable order. In some embodiments, each authorization provider may be provided with a different authentication information. This way, the authorization provider that actually provides approval of the secured action, or access to the secured environment and/or information may be identified (in the event that multiple authorization providers are contacted at once).

In some embodiments, the authentication preferences may be configured such that a newly added authorization provider may not be allowed to provide authorization for an initiating time period. In this way, a malicious user cannot merely add a "friend" that is capable of approving a secured action, or access to a secured environment, or information.

The authentication preferences may be entered by the user of the initiating computing device 107 using a user interface of the initiating computing device 107. The initiating computing device 107 may be further configured to transmit the received authentication preferences to the server system 103. The server system 103 may then store the received authentication preferences in the database 101 coupled to the server system 103.

In some embodiments, the authentication information is a one-time pin (OTP). In some embodiments, the request for authentication is received at the server system 103 after the user of the initiating computing device 107 has successfully entered information they know (e.g., password or Personal Identification Number (PIN)). In some embodiments, the authentication information is randomly generated by the server system 103 and/or stored in the database 101. In some embodiments, each authorization providing computing device 109 may be associated with distinct authentication information.

In some embodiments, the server system 103 is configured to receive an authentication input. The authentication input may be provided by the initiating computing device 107 or the authorization providing computing device 109. The server system 103 may then determine whether the received authentication input matches the authentication information that was transmitted to the authorization providing computing device 109. Determining whether the received authentication input matches the authentication information that was transmitted to the authorization providing computing device 109 may include comparing the authentication information that was generated and transmitted to the authorization providing computing device 109 to the authentication input received at the server system 103. In some embodiments, the authentication information that was generated and transmitted to the authorization providing computer device may be stored in the database 101. In some embodiments, the authentication information may be retrieved from the database 101 in order to complete the comparison.

In some embodiments, when the authentication input received by the server system 103 matches the generated authentication information that was transmitted to the authorization providing computing device 109, the request for security authentication may then be completed. This may entail providing the user of the initiating computing device 107 access to the secured environment or secured information. For example, the user may then be able to reset their password, login to an online banking account, access a social media page, and the like.

Figure 2:
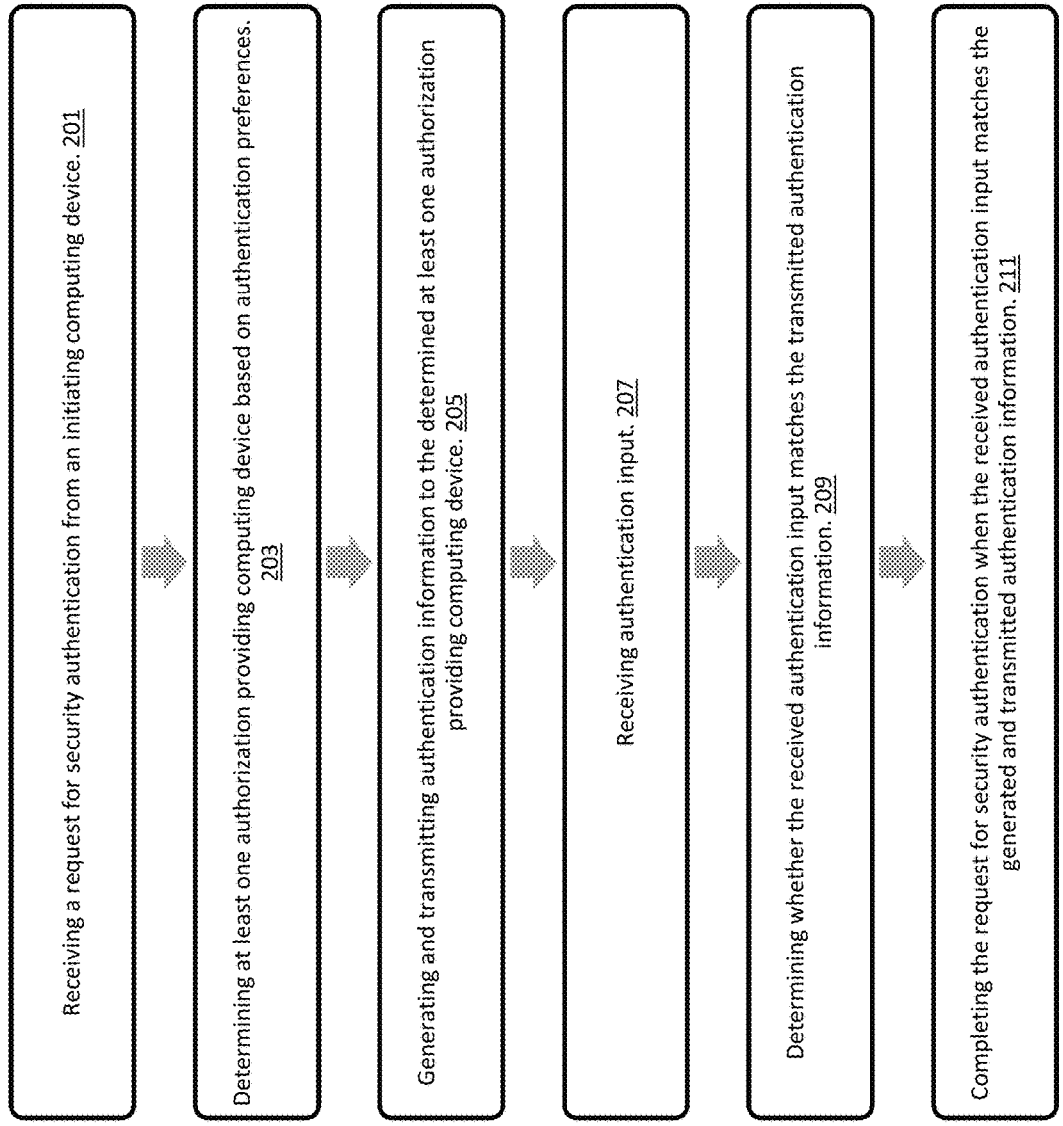
FIG. 2 illustrates a process for improved security authentication in accordance with some embodiments of the present disclosure.

FIG. 2 illustrates a process for improved security authentication in accordance with some embodiments of the present disclosure. In a first step 201, a server system 103 may receive a request for security authentication from an initiating computing device 107. In a second step 203, the server system 103 may determine at least one authorization providing computing device 109 based on authentication preferences. In a third step 205, the server system 103 may generate and transmit authentication information to the determined authorization providing computing devices 109. In a fourth step 207, the server system 103 may receive authentication input. In a fifth step 209, the server system 103 may determine whether the received authentication input matches the transmitted authentication information. In a sixth step 211, the server system 103 may complete the request for security authentication when the received authentication input matches the generated and transmitted authentication information.

In some embodiments, an improved method for security authentication may also include a server system that performs the steps of receiving a request for security authentication from an initiating computing device, determining an authorization providing computing device distinct from the initiating computing device based on authentication preferences stored in a database communicatively coupled to the server system, generating and transmitting authentication information to the determined authorization providing computing device, receiving authentication input from the initiating computing device, determining whether the received authentication input matches the transmitted authentication information and completing the request for security authentication when the received authentication input matches the generated and transmitted authentication information.

Figure 3:
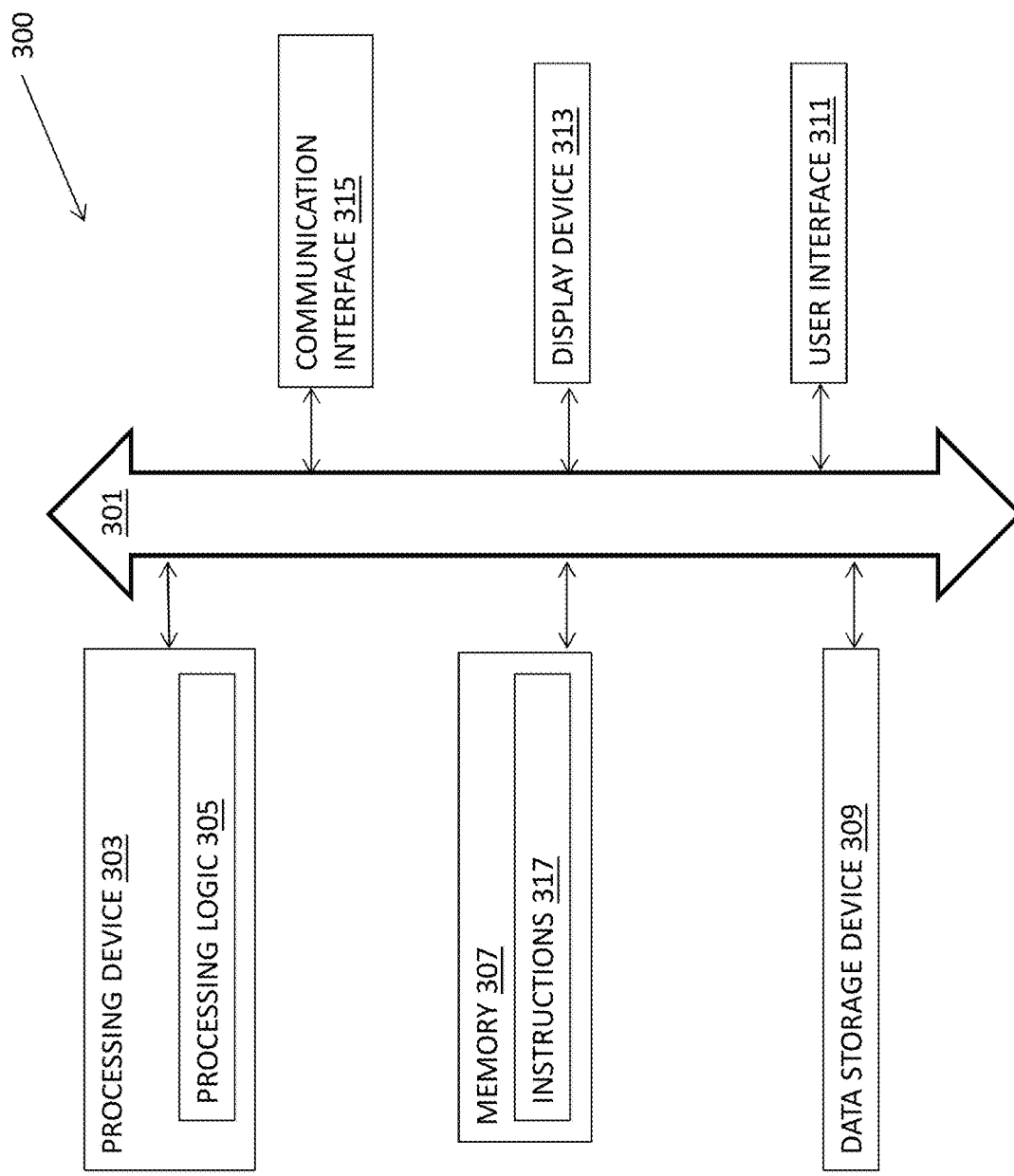
FIG. 3 illustrates a computer system in accordance with some embodiments of the present disclosure.

FIG. 3 illustrates a computer system in accordance with some embodiments of the present disclosure. FIG. 3 illustrates a functional block diagram of a machine in the example form of computer system 300, within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, each of the user computing device 101 and the server system 103 of FIG. 1 may be implemented by the example machine shown in FIG. 3 (or a combination of two or more of such machines).

Example computer system 300 may include processing device 303, memory 307, data storage device 309 and communication interface 315, which may communicate with each other via data and control bus 301. In some examples, computer system 300 may also include display device 313 and/or user interface 311.

Processing device 303 may include, without being limited to, a microprocessor, a central processing unit, an application specific integrated circuit (ASIC), a field programmable gate array (FPGA), a digital signal processor (DSP) and/or a network processor. Processing device 303 may be configured to execute processing logic 305 for performing the operations described herein. In general, processing device 303 may include any suitable special-purpose processing device specially programmed with processing logic 305 to perform the operations described herein.

Memory 307 may include, for example, without being limited to, at least one of a read-only memory (ROM), a random access memory (RAM), a flash memory, a dynamic RAM (DRAM) and a static RAM (SRAM), storing computer-readable instructions 317 executable by processing device 303. In general, memory 307 may include any suitable non-transitory computer readable storage medium storing computer-readable instructions 317 executable by processing device 303 for performing the operations described herein. Although one memory device 307 is illustrated in FIG. 3, in some examples, computer system 300 may include two or more memory devices (e.g., dynamic memory and static memory).

Computer system 300 may include communication interface device 311, for direct communication with other computers (including wired and/or wireless communication), and/or for communication with network 105 (see FIG. 1). In some examples, computer system 300 may include display device 313 (e.g., a liquid crystal display (LCD), a touch sensitive display, etc.). In some examples, computer system 300 may include user interface 311 (e.g., an alphanumeric input device, a cursor control device, etc.).

In some examples, computer system 300 may include data storage device 309 storing instructions (e.g., software) for performing any one or more of the functions described herein. Data storage device 309 may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, soft ware, Software applications or code) include machine instructions for a programmable processor, and may be implemented in a high-level procedural and/or object-oriented programming language, and/or in assembly/machine language. As used herein, the terms "machine-readable medium' "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components. The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention. For example, much of this document has been described with respect to television advertisements, but other forms of future, viewership-based advertisements may also be addressed. Such as radio advertisements and on-line video advertisements. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although the present disclosure may provide a sequence of steps, it is understood that in some embodiments, additional steps may be added, described steps may be omitted, and the like. Additionally, the described sequence of steps may be performed in any suitable order.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

Thus, the foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments.

The invention claimed is:

1. An improved system for security authentication comprising:
    a plurality of computing devices; and
    a server system communicatively coupled to the plurality of computing devices, the server system comprising a non-transitory memory comprising computer program code and a processor, wherein execution of the computer program code causes the server system to:
        determine, based on input received from a user of an initiating computing device from among the plurality of computer devices, authentication preferences, wherein the authentication preferences comprises preferred authorization providers, preferred authorization provider mode of communication, response timing preferences, and a preferred prioritization scheme for authorization providers;
        store, in a database communicatively coupled to the server system, the determined authentication preferences;
        receive, from an initiating computing device from among the plurality of computer devices, a request for security authentication;
        initiate, based on the received request for security authentication a security authentication process, the security authentication process causing the server system to:
            determine an authorization providing computing device from among the plurality of computer devices based on the preferred prioritization scheme, wherein a user of the initiating computing device is distinct from a user of the authorization providing computing device;
            generate and transmit authentication information to the determined authorization providing computing device in accordance with the preferred authorization provider mode of communication;

receive, from the initiating computing device, an authentication input; determine whether the received authentication input matches the transmitted authentication information;

complete the request for security authentication when the received authentication input matches the generated and transmitted authentication information and the received authentication input is received within a time-out period of the response timing preferences; and determine a second authorization providing computing device from among the plurality of computer devices in accordance with the preferred prioritization scheme responsive to not receiving authentication input within the time-out period.

2. The system of claim 1, wherein the authentication information is transmitted to the determined at least one authorization providing computing device via at least one of text, email, a telephone call, a push notification, and a software application.

3. The system of claim 1, wherein the initiating computing device comprises a user interface configured to receive authentication preferences from the user and the initiating computing device is further configured to store the received authentication preferences in the database.

4. The system of claim 1, wherein the authentication information is a one-time pin (OTP).

5. The system of claim 1, wherein the authentication information is transmitted to a plurality of authorization providing computing devices from among the authorization providing computing device sequentially in accordance with the preferred prioritization scheme.

6. The system of claim 1, wherein the server system provides an updated user interface to the initiating device, wherein the updated user interface is configured to receive the authentication input.

7. An improved method for security authentication comprising:

determining, via a server system, authentication preferences, wherein the authentication preferences comprises preferred authorization providers, preferred authorization provider mode of communication, response timing preferences, and a preferred prioritization scheme for authorization providers, the server system comprising a non-transitory memory including computer program code and a processor;

storing, in a database communicatively coupled to the server system, the determined authentication preferences;

receiving, via the server system, a request for security authentication from an initiating computing device; and initiating, based on the received request for security authentication a security authentication process, the security authentication process comprising the steps of:

determining, via the server system, an authorization providing computing device from among a plurality of computing devices based on the preferred prioritization scheme, wherein a user of the initiating computing device is distinct from a user of the authorization providing computing device;

generating and transmitting, via the server system, authentication information to the determined authorization providing computing device in accordance with the preferred authorization provider mode of communication;

receiving, via the server system, an authentication input;

determining, via the server system, whether the received authentication input matches the transmitted authentication information;

completing, via the server system, the request for security authentication when the received authentication input matches the generated and transmitted authentication information and the received authentication input is received within a time-out period of the response timing preferences; and determining a second authorization providing computing device from among the plurality of computer devices in accordance with the preferred prioritization scheme responsive to not receiving authentication input within the time-out period.

8. The method of claim 7, wherein the authentication information is transmitted to the determined authorization providing computing device via at least one of text, email, a telephone call, a push notification, and a software application.

9. The method of claim 7, wherein the initiating computing device comprises a user interface configured to receive authentication preferences from the user and the initiating computing device is further configured to store the received authentication preferences in the database.

10. The method of claim 7, wherein the authentication information is a one-time pin (OTP).

11. The method of claim 7, wherein transmitting, via the server system, authentication information to the determined authorization providing computing device is conducted sequentially in accordance with the preferred prioritization scheme.

12. The method of claim 7, comprising providing an updated user interface to the initiating device that is configured to receive the authentication input.

13. The method of claim 7, wherein receiving authentication input comprises receiving authentication input from at least one of the initiating computing device and the authorization providing computing devices.

14. An improved method for security authentication comprising:

determining, via a server system, authentication preferences, wherein the authentication preferences comprises preferred authorization providers, preferred authorization provider mode of communication, response timing preferences, and a preferred prioritization scheme for authorization providers, the server system comprising a non-transitory memory including computer program code and a processor;

storing, in a database communicatively coupled to the server system, the determined authentication preferences;

receiving, via the server system, a request for security authentication from an initiating computing device; and initiating, based on the received request for security authentication a security authentication process, the security authentication process comprising the steps of:

determining, via the server system, an authorization providing computing device distinct from the initiating computing device based on the preferred prioritization scheme, wherein the authorization providing computing device and the initiating computing device are operated by distinct users;

generating and transmitting, via the server system, authentication information to the determined authorization providing computing device in accordance with the preferred authorization provider mode of communication;

receiving, via the server system, an approval from the determined authorization providing computing device after the determined authorization providing computing device verifies the identity of a user of the determined authorization providing computer device;

completing, via the server system, the request for security authentication when an approval is received, when the approval is received within a time-out period of the response timing preferences; and determining a second authorization providing computer device from among the plurality of computer devices in accordance with the preferred prioritization scheme responsive to not receiving approval within the time-out period.

\* \* \* \* \*